Figure 2:
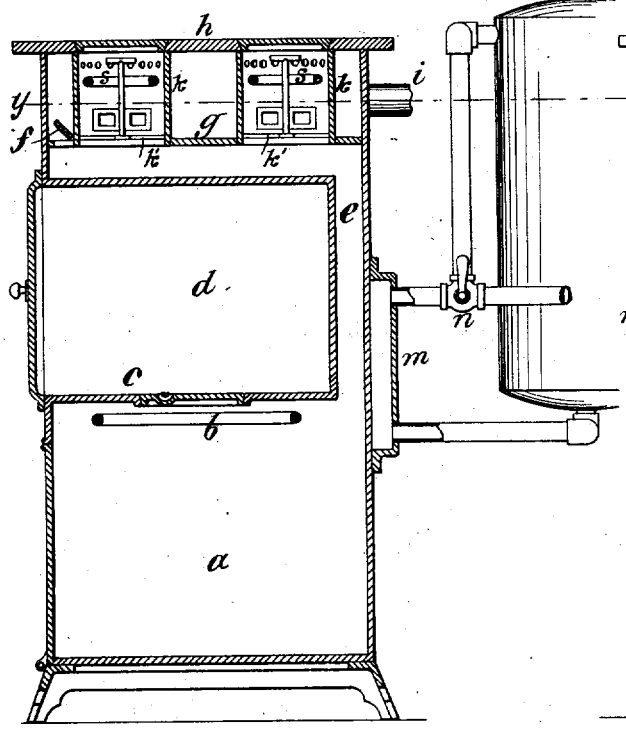

W. N. MILSTED.

GAS COOKING STOVE.

No. 10,577. Reissued Apr. 7, 1885.

Witnesses:
C. L. Sundgren
Emil Schwartz

Inventor:
Wm N. Milsted
by his Attys
Brown & Hall

N. PETERS, Photo-Lithographer, Washington, D. C.

2 Sheets—Sheet 2.

W. N. MILSTED.

GAS COOKING STOVE.

No. 10,577. Reissued Apr. 7, 1885.

Witnesses:

Matthew Pollock

C. L. Sundgren

Inventor:

Wm. N. Milsted by his Attys.

Brown & Hall

N. PETERS, Photo-Lithographer, Washington, D. C.

UNITED STATES PATENT OFFICE.

WILLIAM N. MILSTED, OF BROOKLYN, NEW YORK.

GAS COOKING-STOVE.

SPECIFICATION forming part of Reissued Letters Patent No. 10,577, dated April 7, 1885.

Original No. 303,034, dated August 5, 1884. Application for reissue filed October 9, 1884.

*To all whom it may concern:*

Be it known that I, WILLIAM N. MILSTED, a citizen of the United States, residing at Brooklyn, in the county of Kings and State of New York, have invented a new and useful Gas Cooking-Stove, of which the following is a specification.

The invention relates to a gas cooking-stove having a closed top provided with pot-holes.

The invention consists in the combination, in a closed-top gas cooking-stove, with a lower or oven burner and one or more supplementary burners arranged below a pot-hole or pot-holes in the top plate, of a casing containing each supplementary burner extending downward from the top plate, and constructed to receive fresh air for supporting combustion at its supplementary burner, and flues or passages whereby the hot products of combustion from the lower burner may be made to pass through the casing or casings of the supplementary burner or burners, to make the heat available at the pot hole or holes, or made to pass around said casing or casings when the supplementary burner or burners are in use.

The invention also consists in the combination, in a closed-top gas cooking-stove, with a lower or oven burner and one or more supplementary burners, of a casing containing each supplementary burner, and constructed to receive air to support combustion in its contained burner, flues, or passages, and a damper whereby the hot products of combustion from the lower burner may be made to pass through or around the one or more casings of the supplementary burner or burners on their way to the escape-pipe.

The invention also consists in novel combinations of parts in gas-stoves for cooking, by which the heat above the oven may be concentrated upon one or more of several openings in the top plate of the stove, and by which one or more additional burners may be combined with the top plate and used separately in cases of special urgency.

Although the complete efficiency of a cooking stove or range will be best secured by the combination of both the features last above named, either of them alone may be used with advantage in connection with an ordinary stove.

To enable others skilled in the art to which it appertains to make and use my invention, I will proceed to describe its construction and operation with reference to the drawings.

Figure 1:
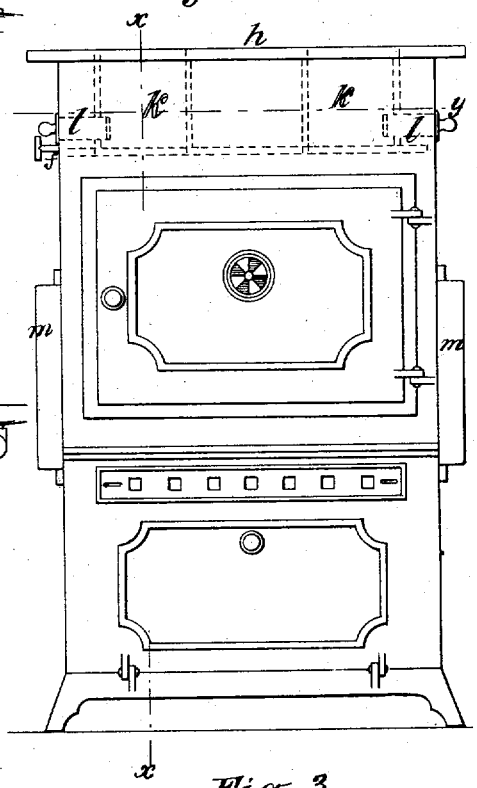
Figure 4:
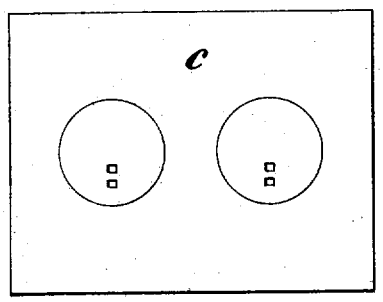
Figure 3:
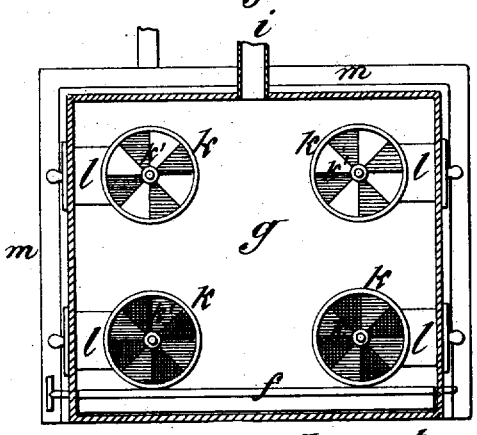
Figure 5:
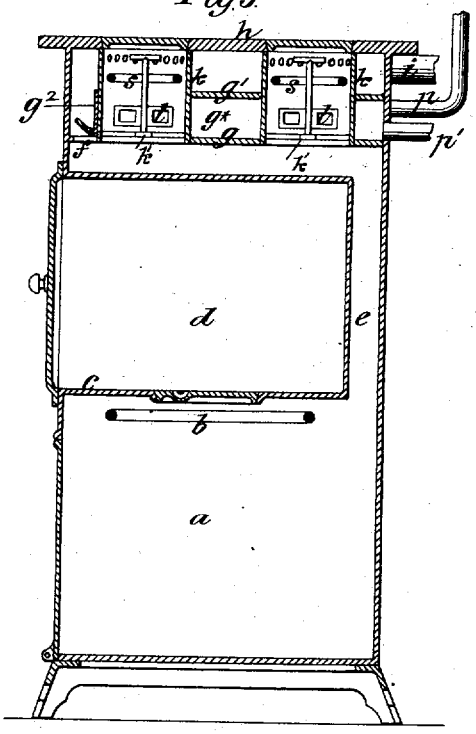
Figure 6:
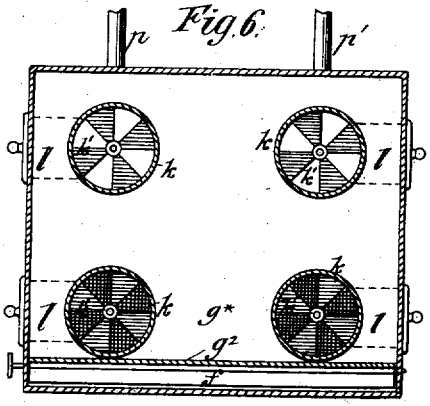

Figure 1 is a front elevation of a stove in which these features have been compactly arranged to work in combination. Fig. 2 is an elevation in section on the line *x x* of Fig. 1. Fig. 3 is a plan of a section on the line *y y* of the preceding figures, and shows the manner in which the upper supplementary burners are combined with the upper flue under the top plate. Fig. 4 is a plan of the bottom plate of the baking-oven; and Figs. 5 and 6 are respectively a vertical and a horizontal section similar to Figs. 2 and 3, and illustrating a modification of my invention.

In the roasting-oven *a* the meat or other material that is being cooked is exposed to the action of the radiant heat proceeding, primarily, from the burner *b*, placed just below its upper plate, *c*, that forms the bottom plate of the baking-oven *d*, in which the pie or other article being baked is immersed in an atmosphere of hot air. In this plate *c* there are one or more openings furnished with covers, as an ordinary top plate, so that in cases where the baking-oven is not otherwise in use the openings in its bottom plate directly over and near the burner may be used for boiling a kettle or other similar purpose different from that for which an oven has been hitherto used. The products of combustion from the burner *b* pass through the flue *e* behind, around, and above the baking-oven, through the damper-opening *f* in the baffle-plate *g*, and under the top plate, *h*, to the stove-pipe *i*, by which they are delivered to the chimney. The cylinders *k*, extending from the baffle-plate *g* to the top plate, *h*, are closed at the top by ordinary stove-lids covering pot-holes, and, as here shown, are closed at the bottom by circular dampers *k'*, fitted with handles that reach conveniently near the top. When the damper *f* is closed, and the dampers *k'* are all open, the hot-air from the flue *e* rises into all four of the cylinders *k*, through the open dampers at their lower ends, and passes through small holes in their upper parts on its way to the stove-pipe *i*, and if it be desired to concentrate all the heat upon any one cylinder, the dampers *k'* of the others are closed, so that the hot air from the flue must all pass into that single cylinder. The cylinders *k* are also fitted with separate burners *s*, any one of which may be isolated and used by closing the lower damper *k'* to exclude the products passing through the flue from the lower burner, and by opening the vent *l* (shown in the drawings) for the admission of fresh air. When the dampers *k'* are all closed, the hot products of combustion from the lower burner pass through the damper *f*, and around the cylinders or casings *k*. When any one of the supplementary burners is used, the products of combustion from it escape directly through the holes in its cylinder *k*, and do not enter any other of the cylinders or casings *k*. The roasting and baking in appropriate ovens, and the boiling on the top plate of the stove, may be simultaneously effected by the lower burner alone. If it should be desired to proceed more expeditiously with the boiling or other work being done on the top plate, one or more burners of the cylinders *k* may be lighted, and if the oven *d* be not in use for baking, it may be used for boiling a kettle expeditiously, or other similar purpose. By the addition of another plate to separate a flue, the space around the cylinders *k*, between the baffle-plate and the top plate, may be utilized for a hot-water tank. In Figs. 5 and 6 I have shown such a construction. By reference to these figures it will be seen that the cylinders or casings *k* extend as before from the top plate, *h*, to the baffle-plate *g*, but between the two is a horizontal partition or plate, *g'*, which extends across from one side of the stove nearly to the damper-opening *f*, and is there joined by an upright partition, $g^2$, to the plate *g*. The space between the plate *g'* and *g* then forms a water-tank, $g^*$, to which water may be supplied by a pipe, *p*, and from which hot water may be drawn by a pipe, *p'*. In this example of my invention the smoke-pipe *i* is above the plate *g'*, and the products of combustion of both the lower and upper burners pass over this plate to the pipe *i*. In Figs. 2 and 3, however, is shown a water-back, *m*, around three sides of the stove, which is connected by circulating-pipes with a boiler or tank, the hot-water pipe being fitted with a branch and three-way cock, *n*, by which hot water may be drawn directly from the water-back without waiting for the large body of water in the tank to become sufficiently heated.

I do not here claim the arrangement for drawing hot water shown in Figs. 2 and 3, as it is the subject of Letters Patent No. 305,400, granted to me September 16, 1884.

I am aware that it is not new in a gas cooking-stove to arrange a number of supplementary burners in a space below the top plate, the burners not being contained in cylinders or casings or isolated from each other in any way, and to pass the products of combustion from the lower burner through this space to the smoke-pipe.

I am also aware that it is not new to arrange a single burner or cluster of burners in one cylinder or casing below the top plate of a cooking-stove, and to pass the products of combustion from a lower burner around said casing on their way to the escape-pipe, the bottom of the cylinder or casing being permanently closed, so that the products of combustion from the lower burner could not be made available at the pot-hole above the cylinder or casing.

I am also aware that supplemental burners have been arranged in cylinders or casings projecting upward from the top plate of a stove; but in that stove the hot products of combustion from a lower burner were carried away below the top plate, and never passed either through or around the said cylinders or casings.

I am also aware that it is not new to arrange supplementary burners in casings which are entirely below and do not project upward to the top plate, and which do not, therefore, concentrate the heat of a supplementary burner upon a pot-hole, as does a cylinder extending downward from the top plate.

I am also aware that it is not new to arrange supplementary burners below pot-holes in a closed-top stove, and to protect said burners in cylinders which extend downward from the top plate; but in that stove the sole avenue of escape for the products of combustion from certain of the cylinders is through other of the cylinders, and hence all the supplementary burners cannot be used at the same time; also, in that stove the products of combustion from the lower burner cannot be made to pass through any of the cylinders or casings, and hence cannot be concentrated on any one or more of the pot-holes.

I do not claim any of the stoves above described as included in my invention; but

I claim as my invention, and desire to secure by Letters Patent—

1. In a closed-top gas cooking-stove, the combination, with a lower or oven burner, and one or more supplementary burners arranged below a pot-hole or pot-holes in the top plate, of a casing containing each supplementary burner extending downward from the top plate, and constructed to receive fresh air to support combustion at said supplementary burner, and flues or passages whereby the hot products of combustion from the lower burner may be made to pass through the casing or casings of the supplementary burner or burners to make the heat available at the pot hole or holes, or may be made to pass around the casing or casings when one or more of the supplementary burners is in use, substantially as herein described.

2. In a closed-top gas cooking-stove, the combination, with a lower or oven burner and one or more supplementary burners, of a casing containing each supplementary burner, and constructed to receive air to support combustion in its contained burner, flues, or passages, and a damper whereby the hot products of combustion from the lower burner may be made to pass through or around the one or more casings of the supplementary burner or burners on their way to the escape-pipe, substantially as herein described.

3. In a closed-top gas cooking-stove, the combination, with the oven *d*, and the lower burner, *b*, for heating the same, of the flue *e*, extending upward past the oven, the cylinders *k*, and appropriate dampers, as described, by which the surplus heat from the lower burner, *b*, may be concentrated upon one or more cooking-holes in the top plate of the stove.

4. The combination, with a stove, of supplementary burners in the cylinders *k*, fitted with dampers and with air-pipes *l*, substantially as described, by which any one or more of them may be used independently, if desired.

WM. N. MILSTED.

Witnesses:
C. HALL,
FREDK. HAYNES.